United States Patent
Fraser et al.

(10) Patent No.: US 7,369,849 B2
(45) Date of Patent: May 6, 2008

(54) METHOD AND SYSTEM FOR REGISTERING AN IN-VEHICLE CELLULAR PHONE

(75) Inventors: Ronald W. Fraser, Lake Orion, MI (US); James A. Walby, Delavan, WI (US)

(73) Assignees: General Motors Corporation, Detroit, MI (US); Motorola, Inc., Harvard, IL (US)

( * ) Notice: Subject to any disclaimer, the term of this patent is extended or adjusted under 35 U.S.C. 154(b) by 913 days.

(21) Appl. No.: 10/212,957

(22) Filed: Aug. 6, 2002

(65) Prior Publication Data
US 2004/0203767 A1   Oct. 14, 2004

(51) Int. Cl.
*H04Q 7/20* (2006.01)
(52) U.S. Cl. .................. 455/435.1; 455/343.1; 455/436; 370/311
(58) Field of Classification Search ............ 455/435.1, 455/343.1, 343.2, 436, 343.5; 370/311
See application file for complete search history.

(56) References Cited

U.S. PATENT DOCUMENTS

| | | | | |
|---|---|---|---|---|
| 5,530,723 A | * | 6/1996 | Maplestone | 375/344 |
| 5,629,975 A | * | 5/1997 | Tiedemann et al. | 455/435.1 |
| 6,064,889 A | * | 5/2000 | Fehnel | 455/511 |
| 6,223,038 B1 | * | 4/2001 | Iseyama et al. | 455/435.3 |
| 6,243,372 B1 | * | 6/2001 | Petch et al. | 370/350 |
| 6,473,607 B1 | * | 10/2002 | Shohara et al. | 455/343.1 |
| 6,591,101 B1 | * | 7/2003 | Shimbori | 455/435.1 |
| 6,799,030 B2 | * | 9/2004 | Barber et al. | 455/343.1 |

* cited by examiner

*Primary Examiner*—Nghi H. Ly

(57) ABSTRACT

The invention provides a method of registering a cellular phone in a mobile vehicle while in a quiescent mode. Whether timer-based registration is enabled is determined. Whether one of a counter or an interval timer has reached a predetermined threshold is determined based on the timer-based registration determination. The cellular phone is registered during the next wake state when the predetermined threshold has been reached.

17 Claims, 2 Drawing Sheets

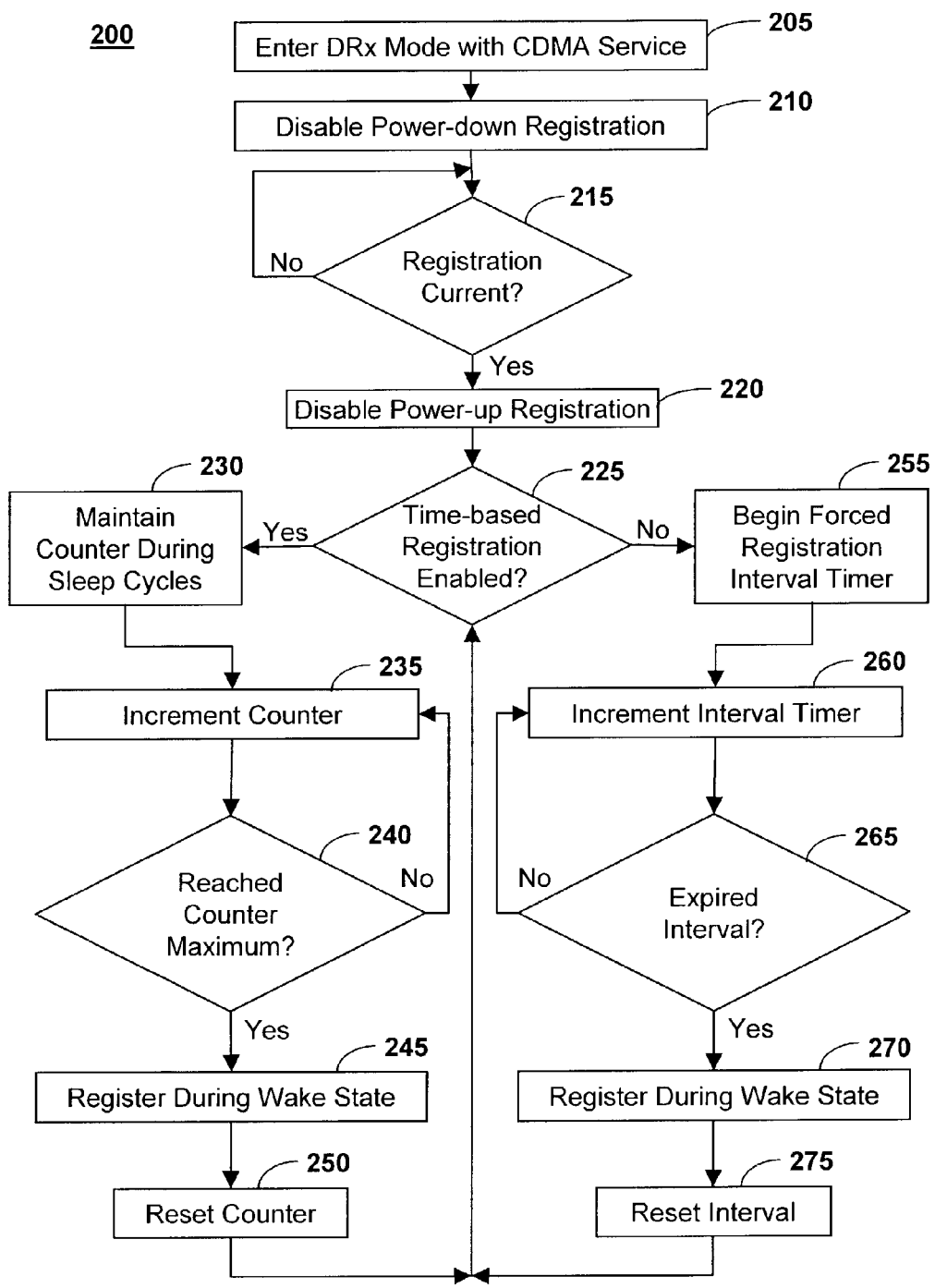

METHOD AND SYSTEM FOR REGISTERING AN IN-VEHICLE CELLULAR PHONE

FIELD OF THE INVENTION

This invention relates generally to data transmission over a wireless communication system. More specifically, the invention relates to a method and system for registering an in-vehicle cellular phone.

BACKGROUND OF THE INVENTION

The scope of wireless communications to mobile vehicles is steadily growing to include services that may be requested while the vehicle is off or in a quiescent mode. These services include maintenance and diagnostic functions, system updates, vehicle position determination, unlocking of the doors, or vehicle alarm silencing.

While a number of automobiles have been equipped with analog network access devices, the newest vehicles are more likely to be equipped with CDMA-enabled wireless communication and network-access devices. Code division multiple access, or CDMA, is a digital wireless technology that uses a spread-spectrum technique to scatter a radio signal across a wide range of frequencies and provides a greater total call capacity, improved voice quality and fewer dropped calls in wireless carrier systems.

Normally when the ignition of a network-enabled vehicle has been turned off, it is placed into a discontinuous-receive (DRx) mode, a feature used in cellular-phone radio-based applications to put network access devices and other unnecessary electrical components into a quiescent or sleep mode for as much time as possible. This powered-down state minimizes current drain on the battery. To perform a requested function while the ignition of the vehicle is off, the embedded communication device may be awakened after a predetermined time, the desired function performed, and placed back into the sleep mode. The DRx process may limit the amount of time a network access device or telematics unit can be awake during a wake-up period, and may require quiescent modes of prescribed duration during which the in-vehicle cellular may be unable to register. The time period between wake-up operations may vary from ten minutes to several days or more when a vehicle has not been moved or driven.

Even with newer CDMA-enabled hardware, issues may still arise due to the process in which a phone registers each time a network access device powers up and powers down. If CDMA-enabled network access devices in a large number of vehicles continue to follow registration protocols of wireless network carriers with the prescribed frequency, the CDMA system may be unavailable to service calls. A CDMA cellular phone may normally register one to three times per hour, but when it is incorporated into an in-vehicle wireless communication device with a discontinuous-receive mode, the registration interval may increase, for example, to every ten minutes. Where there is a high concentration of parked vehicles such as an airport, stadium or mall parking lot, CDMA-enabled network access devices may be potentially rendered inoperable by a high volume of the devices cycling through the periodic registration procedures implemented in current wireless carrier systems.

A method is needed to mitigate the risk of excessive registration activity on the network of a wireless carrier while still keeping the CDMA-enabled network access device unit registered in the network system. A desirable method would help maintain the availability of CDMA channels for a vehicle to receive a call page and to perform a service request, while maintaining low power consumption at the vehicle. It is an object of this invention, therefore, to provide a method for registering an in-vehicle communications device in a quiescent vehicle, and to overcome the deficiencies and obstacles described above.

SUMMARY OF THE INVENTION

One aspect of the invention is a method of registering a cell phone in a mobile vehicle while in a quiescent mode. Whether timer-based registration is enabled may be determined. Whether one of a counter or an interval timer has reached a predetermined threshold may be determined based on the timer-based registration determination. The cellular phone may be registered during the next wake state when the predetermined threshold has been reached.

Another aspect of the invention provides a computer usable medium including a program for registering a cellular phone in a mobile vehicle. The computer program may include code to determine whether timer-based registration is enabled. The program may include code to determine whether one of a counter or an interval timer has reached a predetermined threshold based on the timer-based registration determination. The program may include code to register the cellular phone during the next wake state when the predetermined threshold has been reached.

Another aspect of the invention provides a system for registering a cellular phone in a mobile vehicle while in a quiescent mode. The system may be used to determine whether timer-based registration is enabled; to determine whether one of a counter or an interval timer has reached a predetermined threshold based on the timer-based registration determination; and to register the cellular phone during the next wake state when the predetermined threshold has been reached.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method for registering a cellular phone in a mobile vehicle while in a quiescent mode, in accordance with the current invention.

DETAILED DESCRIPTION OF THE PRESENTLY PREFERRED EMBODIMENTS

Figure 1:
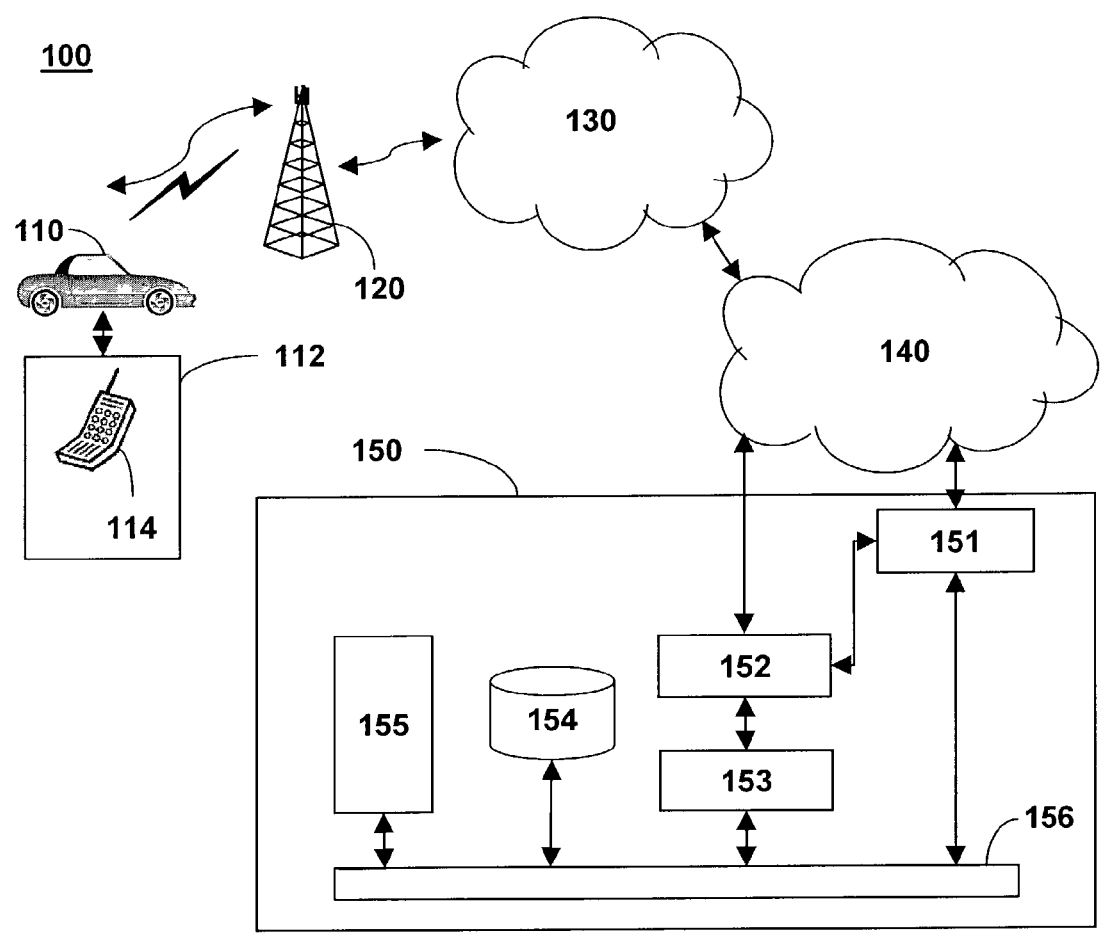
FIG. 1 is an illustration of one embodiment of a system for registering a cellular phone in a mobile vehicle while in a quiescent mode, in accordance with the current invention.

FIG. 1 shows an illustration of one embodiment of a system of registering a cellular phone in a mobile vehicle while in a quiescent mode, in accordance with the present invention at 100. Cell-phone registration system 100 may use current hardware within telecommunication systems and networks that are enabled by code division multiple access technology (CDMA), but implement new software applications and methods to register a cellular phone.

In-vehicle cell-phone registration system 100 may contain one or more mobile vehicles 110, one or more wireless communication devices 112, one or more wireless carrier systems 120 of a wireless service provider, one or more communication networks 130, one or more land networks 140, and one or more call centers 150. Call center 150 may contain one or more switches 151, one or more data transmission devices 152, one or more communication services managers 153, one or more communication services databases 154, one or more advisors 155, and one or more bus systems 156.

Mobile vehicle 110 may contain an in-vehicle wireless communication device 112, such as a digital mobile or cellular phone 114 with suitable hardware and software for transmitting and receiving data communications. Cellular phone 114 may be a CDMA-enabled communication device. Mobile vehicle 110 may contain a wireless modem for transmitting and receiving data. Mobile vehicle 110 may contain a global positioning system (GPS) unit capable of determining synchronized time and a geophysical location of the mobile vehicle. Mobile vehicle 110 may send to and receive radio transmissions from wireless carrier system 120. Mobile vehicle 110 may contain a digital signal processor, a central processing unit (CPU), a controller, a microcontroller, or a host processor with software and additional hardware to enable communications with the mobile vehicle and to perform other routines and requested services. Cellular phone 114 of wireless communication device 112, the host processor, the GPS unit, and other associated devices such as in-vehicle memory may be contained in a telematics unit located in mobile vehicle 110.

The host processor may control the procedures and software routines for registering cellular phone 114 of wireless communication device 112 with wireless carrier system 120. Cellular phone 114 may receive messages from and send messages to wireless carrier system 120 to determine whether registration is current and to register the phone. Cellular phone 114 may coordinate with the host processor to enable and disable power-up registration and power-down registration. Cellular phone 114 may coordinate with the host processor to make determinations based on registration messages received from wireless carrier system 120. The host processor may contain registers or coordinate with in-vehicle memory to reset or initiate timers and counters, and to increment or decrement the timers and counters based on a system clock or on time slots associated with a wireless telecommunications protocol. The host processor may determine whether a predetermined threshold associated with the timer or the counter has been reached, and may direct operations such as registering the phone during predefined wake states.

Wireless carrier system 120 may be a wireless communications carrier. Wireless carrier system 120 may be, for example, a mobile telephone system or station. The mobile telephone system may be a digital mobile telephone system operating over a prescribed band nominally at 800 MHz, 900 MHz, 1900 MHz, or any suitable band capable of carrying mobile communications. The wireless vehicle communication device may be enabled by code division multiple access technology (CDMA) with greater call capacity than narrow-band multiple access wireless technologies. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center (MSC), also known as a mobile telephone switching office (MTSO). Communications network 130 may comprise services from one or more wireless communications companies. Communications network 130 may be any suitable system or collection of systems for connecting wireless carrier system 120 to a second mobile vehicle 110 or to a call center. Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center.

Land network 140 may connect a first wireless carrier system 120 with a second wireless carrier system 120. Communication network 130 and land network 140 may connect wireless carrier system 120 to a communication node or call center 150.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions.

The call center may contain switch 151. Switch 151 may be connected to land network 140, and may receive a modem carrier signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from communication network 130 to communication services manager 153. Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, communication network 130, land network 140, and data transmission device 152. Communication services manager 153 may send information to mobile vehicle 110 through data transmission device 152, land network 140, communication network 130 and wireless carrier system 120. Communication services manager 153 may determine whether a communication should be sent to mobile vehicle 110. Communication services manager 153 may provide further requests and determinations based on a reply from mobile vehicle 110. Communication services manager 153 may provide information to mobile vehicle 110 from communication services database 154.

Communication services database 154 may contain records on one or more mobile vehicles 110. A portion of communication services database 154 may be dedicated to short message services. Records in communication services database 154 may include vehicle identification, location information, status information, and recent action information regarding mobile vehicle 110. Communication services database 154 may provide information and other support to communication services manager 153.

Advisor 155 may be a real advisor or a virtual advisor. A real advisor may be a human being in verbal communication with mobile vehicle 110. A virtual advisor may be a synthesized voice interface responding to requests from mobile vehicle 110. Advisor 155 may provide services to mobile vehicle 110. Advisor 155 may communicate with communication services manager 153 or any other device connected to bus system 156.

FIG. 2 shows a flow diagram of one embodiment of a method of registering a cellular phone in a mobile vehicle while in a quiescent mode, in accordance with the present invention at 200. Cellular-phone registration method 200 comprises steps to maintain current registration with a wireless carrier while limiting the number of communications between the cellular phone of an in-vehicle wireless communication device and the wireless carrier system.

When a mobile phone is first powered up, it may acquire the best available service. The phone may run an acquisition task to obtain the most preferred service. The phone may search through its list of forward control channels and select one from a preferred carrier with the strongest signal. The phone then may transmit information to identify itself on the corresponding reverse control channel. The mobile vehicle may send information such as its phone number, its electronic serial number, and its home system identification number. The cell site may relay this information to the mobile switching center, which communicates with different databases, switching centers and software programs. Once the phone is registered, the wireless carrier system may be aware that it is available for access, and send the phone various control messages and pages for receiving an incoming phone call.

A mobile vehicle may be part of an in-vehicle wireless vehicle communication device that is enabled by code division multiple access technology (CDMA). A CDMA-enabled wireless communication device or mobile station typically registers with the wireless system before it originates or receives a call. During the registration process, the wireless communication device may be given a temporary mobile station identity (TMSI) that is used for all subsequent call processing. In the current invention, the wireless communication device in a quiescent mobile vehicle may not perform power-up or power-down registration on an access channel when registration is deemed current. By omitting the normally requisite power-down registration, the wireless carrier does not automatically deregister a mobile station immediately upon powering down of the phone or turning off the mobile vehicle. Therefore, the phone may continue to be registered while it is in discontinuous-receive (DRx) mode, limiting the number of registrations required to be processed on an access channel of a wireless carrier system. A CDMA-enabled wireless communication device may enter DRx mode, as seen at block 205. The DRx mode may include, for example, a time when the vehicle communication device is scheduled to awaken and the duration for the vehicle communication device to be awake. The DRx mode may include storing information such as time and location at the initiation of the sleep mode. The discontinuous-receive mode may include setting a time for the next wakening period, and a duration for the wake time. The discontinuous-receive mode may also include actions to place an in-vehicle phone and other systems in the mobile vehicle into a quiescent or powered-down mode. The vehicle communication device may then power down.

Power-down registration of the in-vehicle cellular phone may be disabled when the DRx mode is entered, as seen at block 210. By disabling the power-down registration, the wireless carrier system may retain the current registration of the cellular phone. The powered-down wireless communication device may check an on-board clock or timer to determine when it is time to awaken the phone.

The registration of the phone may or may not be current, as seen at block 215. When the determination has been made that the registration is not current, the phone of the wireless communication device may be registered based on that determination. During typical registration of the phone with a wireless carrier system, the phone may inform the wireless service provider of its presence in the system. A cellular phone typically registers with the wireless system before it originates or receives a call, though it is not required to register in order to originate or receive a call.

Power-up registration may be disabled when the registration is current, as seen at block 220. Because the wireless carrier was not notified that the cellular phone was powered down, as seen back at block 210, it may not need to be notified when powering up, thus conserving registration sequences, power, and control channel capacity. Typically, power-up registration is used to notify the network that the phone is active again and ready to place or receive calls. The current invention may ensure that the registration of the cellular phone remains current through a counter or interval time-based registration while the vehicle is in a sleep or quiescent mode. The cell phone may receive a timer-based registration message from a wireless service provider. A determination may be made on whether timer-based registration is enabled, as seen at block 225 The time for the next registration may be determined either by a counter or time interval algorithm. Timer-based registration may occur when a timer expires in the mobile station and the vehicle wakes up. The wireless communication device of the mobile vehicle may maintain an active counter during its sleep cycles, as seen at block 230. The value of this counter is determined by the network. Time-based registration may be done when a timer expires in the mobile vehicle. With counter-based registration, the wireless communication device may register whenever the counter reaches a predetermined value.

The counter may be incremented based on a time slot associated with a wireless telecommunications protocol, determined by installed or downloaded software application in the cellular phone or wireless communication device, as seen at block 235. For example, the count may be incremented an average of once per 80 millisecond period. The counter may or may not have reached a predetermined threshold or maximum number based on the timer-based registration determination, as seen at block 240. When the determination is made that the counter has not reached its maximum, the counter may continue to increment during sleep cycles, as seen at block 235. A determination may be made that a counter has reached a predetermined threshold and the cellular phone and wireless communication device may be awakened to register during the next wake state, as seen at block 245. Alternatively, the wireless communication device may register during the next wake state before the count has reached a maximum, for example, when the vehicle is towed or moved from a location within one cell of a wireless carrier to a location within another cell, when it is on the fringe of more than one cell, or when environmental conditions change system accessibility.

The counter may be reset subsequent to the cellular-phone registration, as seen at block 250, and then the process or cycle of counting may begin again by receiving a timer-based registration enable status message from the wireless carrier, as seen at block 225.

When a time-based registration is not enabled for the cellular phone of the in-vehicle wireless communication device, a forced registration interval time may begin, as seen at block 255. The interval timer is a predetermined value stored in the embedded communications device to ensure regular registration intervals. Like the counter cycle, the interval-time cycle may be controlled by software in the wireless communication device. The wireless communication device of the mobile vehicle may maintain an interval timer during its sleep cycles. With interval-based registration, the mobile station may register whenever the timer reaches a predetermined interval timer value. The interval timer may be incremented based on a system clock, as seen at block 260. The system clock may take readings, for example, from a global positioning system (GPS) unit in the wireless communication device. An interval timer may or may not have reached a predetermined threshold, as seen at block 265. If the interval timer has not reached a predetermined threshold, the interval timer may be incremented based on a system clock, as seen at block 260.

The cellular phone may be registered during the next wake state when the predetermined threshold has been reached, as seen at block 270. Alternatively, registration of the cellular phone may occur during the next wake state before the interval total has reached its threshold, for example, when the vehicle is towed or moved from a location within one cell of a wireless carrier to a location within another cell, when it is on the fringe of more than one cell, or when environmental conditions change system accessibility.

The interval timer may be reset subsequent to the cellular-phone registration, as seen at block 275, and then the process or cycle of interval timing may begin again by receiving a timer-based registration status message from the wireless carrier, as seen at block 225.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of registering a cellular phone in a mobile vehicle while in a quiescent mode comprising:
    disabling power-down registration when the quiescent mode is entered to maintain a current registration;
    determining whether timer-based registration is enabled when in the quiescent mode;
    determining whether one of a counter or an interval timer has reached a predetermined threshold based on the timer-based registration determination; and
    registering the cellular phone during a next wake state when the predetermined threshold has been reached.

2. The method of claim 1 wherein the counter is incremented based on a time slot associated with a wireless telecommunications protocol.

3. The method of claim 1 wherein the interval timer is incremented based on a system clock.

4. The method of claim 1 further comprising: resetting one of the counter or the interval timer subsequent to the cellular-phone registration.

5. The method of claim 4 further comprising:
    receiving a timer-based registration message from a wireless service provider.

6. The method of claim 1 further comprising:
    determining whether registration is current; and
    registering the phone based on the registration determination.

7. The method of claim 6 further comprising: disabling power-up registration when the registration is current.

8. A computer usable medium including a program for registering a cellular phone in a mobile vehicle while in a quiescent mode comprising:
    computer program code to disable power-down registration when the quiescent mode is entered to maintain a current registration;
    computer program code to determine whether timer-based registration is enabled when in the quiescent mode;
    computer program code to determine whether one of a counter or an interval timer has reached a predetermined threshold based on the timer-based registration determination; and
    computer program code to register the cellular phone during the next wake state when the predetermined threshold has been reached.

9. The computer usable medium of claim 8 further comprising:
    computer program code to reset one of the counter or the interval timer subsequent to the cellular-phone registration.

10. The computer usable medium of claim 8 further comprising: computer program code to receive a timer-based registration message from a wireless service provider.

11. The computer usable medium of claim 8 further comprising:
    computer program code to determine whether registration is current; and
    computer program code to register the phone based on the registration determination.

12. The computer usable medium of claim 11 further comprising: computer program code to disable power-up registration when the registration is current.

13. A system for registering a cellular phone in a mobile vehicle while in a quiescent mode comprising:
    means for disabling power-down registration when the quiescent mode is entered to maintain a current registration;
    means for determining whether one of a counter or an interval timer has reached a predetermined threshold based on the timer-based registration determination; and
    means for registering the cellular phone during the next wake state when the predetermined threshold has been reached.

14. The system of claim 13 further comprising: means for resetting one of the counter or the interval timer subsequent to the cellular-phone registration.

15. The system of claim 13 further comprising:
    means for receiving a timer-based registration message from a wireless service provider.

16. The system of claim 13 further comprising:
    means for determining whether registration is current; and
    means for registering the phone based on the registration determination.

17. The system of claim 16 further comprising:
    means for disabling power-up registration when the registration is current.

* * * * *